(12) United States Patent
Nishifukumoto (10) Patent No.: US 10,594,193 B2
(45) Date of Patent: Mar. 17, 2020

(54) HOLDER, ELECTRIC MOTOR, AND TEMPERATURE DETECTION ELEMENT FIXING METHOD

(71) Applicant: FANUC CORPORATION, Yamanashi (JP)

(72) Inventor: Akira Nishifukumoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/190,555

(22) Filed: Nov. 14, 2018

(65) Prior Publication Data

US 2019/0149019 A1    May 16, 2019

(30) Foreign Application Priority Data

Nov. 16, 2017  (JP) ................................ 2017-220730

(51) Int. Cl.
*H02K 11/25*  (2016.01)
*H02K 11/00*  (2016.01)

(52) U.S. Cl.
CPC .............. *H02K 11/25* (2016.01); *H02K 11/00* (2013.01)

(58) Field of Classification Search
CPC ........... H02K 11/25; H02K 3/52; H02K 11/00
USPC ....................................... 310/68 C
See application file for complete search history.

(56) References Cited

U.S. PATENT DOCUMENTS

| 4,112,405 | A | * | 9/1978 | Joseph | .................. | H01F 27/402 |
| | | | | | | 310/68 C |
| 6,153,954 | A | * | 11/2000 | Uchida | .................. | H02K 11/25 |
| | | | | | | 310/68 C |
| 2013/0294888 | A1 | | 11/2013 | Yokoyama et al. | | |
| 2015/0155760 | A1 | * | 6/2015 | Bessho | .................. | H02K 11/25 |
| | | | | | | 310/68 C |
| 2016/0043619 | A1 | | 2/2016 | Maekawa et al. | | |
| 2016/0261175 | A1 | | 9/2016 | Takamizawa et al. | | |

FOREIGN PATENT DOCUMENTS

| JP | 200392858 A | 3/2003 |
| JP | 2010252508 A | 11/2010 |
| JP | 2011203066 A | 10/2011 |
| JP | 2011254628 A | 12/2011 |
| JP | 2012186902 A | 9/2012 |

(Continued)

OTHER PUBLICATIONS

English Abstract for Japanese Publication No. 2016163471 A, published Aug. 5, 2016, 1 pg.

(Continued)

*Primary Examiner* — Hanh N Nguyen
(74) *Attorney, Agent, or Firm* — Fredrikson & Byron, P.A.

(57) ABSTRACT

A holder for fixing a temperature detection element to a coil includes: a holder body shaped as a circular pillar; a recessed portion formed on a circumferential surface of the holder body, along a central axis of the holder body; a wing portion that extends farther outward than the circumferential surface of the holder body, along a direction intersecting the central axis of the holder body; and a temperature detection element that is housed in the recessed portion so that a portion of the temperature detection element protrudes from the circumferential surface of the holder body.

11 Claims, 8 Drawing Sheets

(56) References Cited

FOREIGN PATENT DOCUMENTS

| | | |
|---|---|---|
| JP | 201561465 A | 3/2015 |
| JP | 201639694 A | 3/2016 |
| JP | 2016163471 A | 9/2016 |
| WO | 2012114419 A1 | 8/2012 |
| WO | 2015040468 A1 | 3/2015 |

OTHER PUBLICATIONS

English Abstract for Japanese Publication No. 2016039694 A, published Mar. 22, 2016, 2 pgs.
English Abstract for Japanese Publication No. 2015061465 A, published Mar. 30, 2015, 1 pg.
English Abstract and Machine Translation for Japanese Publication No. 2010-252508 A, published Nov. 4, 2010, 11 pgs.
English Abstract and Machine Translation for Japanese Publication No. 2003-092858 A, published Mar. 28, 2003, 7 pgs.
English Abstract and Machine Translation for Japanese Publication No. 2011-254628 A, published Dec. 15, 2011, 13 pgs.
English Abstract and Machine Translation for Japanese Publication No. 2011-203066 A, published Oct. 13, 2011, 12 pgs.
English Abstract and Machine Translation for Japanese Publication No. 2012-186902 A, published Sep. 27, 2012, 9 pgs.

\* cited by examiner

HOLDER, ELECTRIC MOTOR, AND TEMPERATURE DETECTION ELEMENT FIXING METHOD

CROSS-REFERENCE TO RELATED APPLICATION

This application is based upon and claims the benefit of priority from Japanese Patent Application No. 2017-220730 filed on Nov. 16, 2017, the contents of which are incorporated herein by reference.

BACKGROUND OF THE INVENTION

Field of the Invention

The present invention relates to a holder, an electric motor, and a temperature detection element fixing method.

Description of the Related Art

Japanese Laid-Open Patent Publication No. 2003-092858 discloses a structure in which a guide for housing a temperature detection element is provided in a space between a coil end and a core of an electric motor, and a temperature sensitive portion of the temperature detection element is made to directly contact the inner surface of winding of the coil end portion by inserting the temperature detection element into the guide.

SUMMARY OF THE INVENTION

However, since there is a tendency for size variation to occur in the temperature detection element, there is a concern about cases where the temperature sensitive portion of the temperature detection element does not contact the inner surface of the winding of the coil end portion even when the temperature detection element is inserted into the guide disclosed in Japanese Laid-Open Patent Publication No. 2003-092858. Accordingly, in Japanese Laid-Open Patent Publication No. 2003-092858, there is a concern about a problem of the tolerable range for the size variation of the temperature detection element to be inserted into the guide provided in the space between the coil end and the core of the motor being extremely narrow.

The present invention aims to solve the problem described above, and it is an object of the present invention to provide a holder, electric motor, and temperature detection element fixing method that expand the tolerable range for the variation in the size of the temperature detection element.

A first aspect of the present invention is a holder that fixes a temperature detection element to a coil, the holder including a holder body shaped as a circular pillar; a recessed portion formed on a circumferential surface of the holder body, along a central axis of the holder body; a wing portion that extends farther outward than the circumferential surface of the holder body, along a direction intersecting the central axis of the holder body; and the temperature detection element that is housed in the recessed portion so that a portion of the temperature detection element protrudes from the circumferential surface of the holder body.

A second aspect of the present invention is an electric motor including the holder described above; a core including a teeth portion; and a coil that is wound around the teeth portion, wherein the holder body is inserted between the teeth portion and the coil, and the wing portion is fixed to the coil.

A third aspect of the present invention is a temperature detection element fixing method using the holder described above, the method including an insertion step of inserting the holder body between the coil and the teeth portion of the core around which the coil is wound; a rotation step of rotating the holder so that a portion of the temperature detection element protruding from the recessed portion contacts the coil; and a bonding step of bonding the wing portion and the coil.

According to the present invention, it is possible to fix the temperature detection element to the coil in a state that the temperature detection element is in contact with the coil even when there is variation in the size of the temperature detection element. As a result, it is possible to expand the tolerable range for size variation of the temperature detection element.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes the present invention through embodiments of the present invention. The embodiments described below do not limit the invention, which is described in the claims. All combination of features described in the embodiments are not necessarily essential to the means for solving the problem of the present invention.

Embodiments

[Configuration of the Electric Motor]

Figure 1:
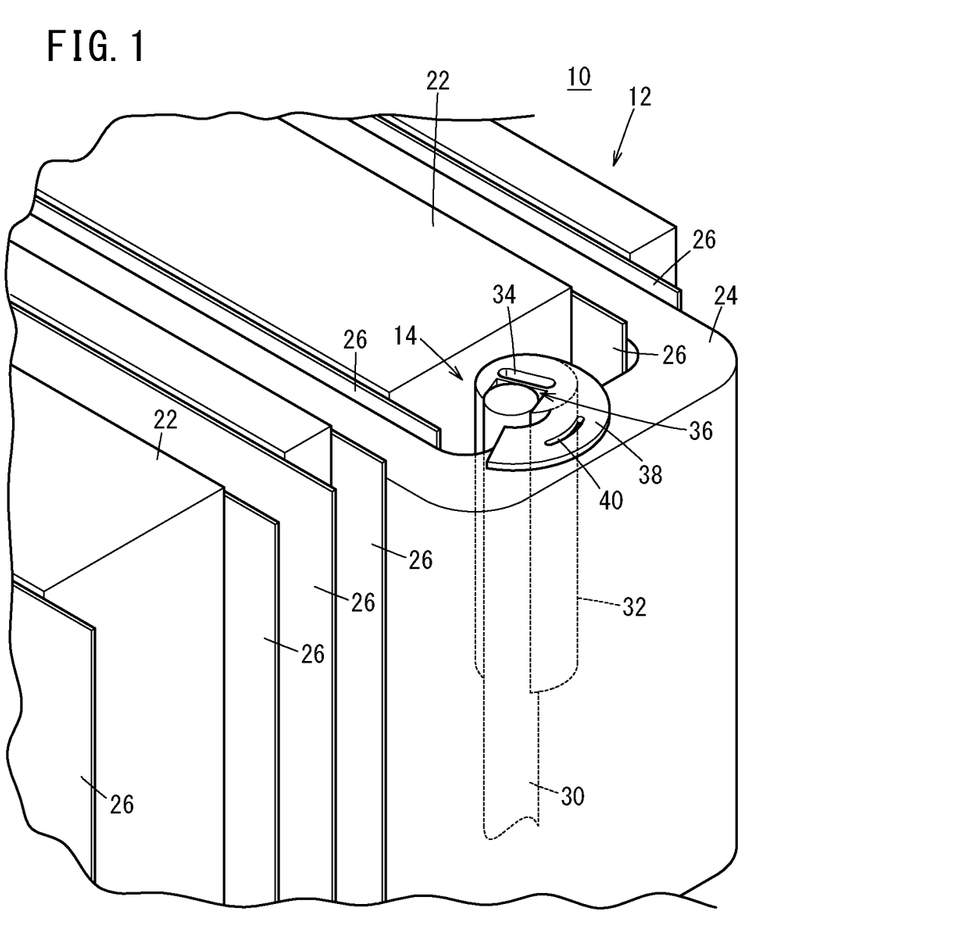
FIG. 1 is a schematic view of a configuration of a portion of an electric motor.
Figure 2:
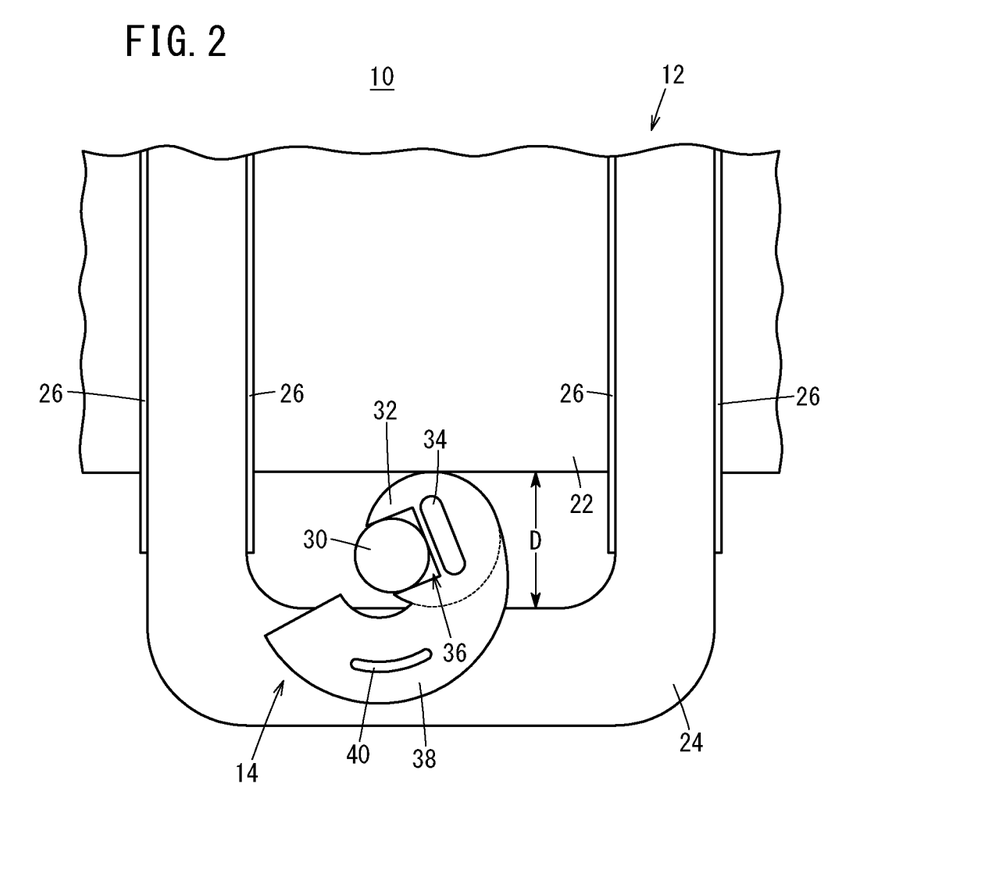
FIG. 2 is a perspective view of a portion of the electric motor, as viewed from a prescribed direction.

FIG. 1 is a schematic view of the configuration of a portion of an electric motor 10. FIG. 2 is a perspective view of a portion of the electric motor 10, as viewed from a prescribed direction. The electric motor 10 includes a core 12 and a holder 14.

[Configuration of the Core]

The core 12 is formed of an iron-based metal in the shape of a cylinder that has a substantially cylindrical or rectangular parallelepiped shape, and includes a plurality of teeth portions 22 that protrude toward the inner circumference side and are provided with spaces therebetween in the circumferential direction. A coil 24 is wound around each teeth portion 22, and insulating material 26 is provided between the teeth portions 22 and the coils 24 in the circumferential direction of the core 12. In FIG. 1, the coils 24 on the left side of the page are omitted for convenience.

[Configuration of the Holder]

The holder 14 is a member for fixing a temperature detection element 30 to the coil 24, and includes a holder body 32 shaped as a circular pillar. The holder body 32 is inserted between the teeth portion 22 and the coil 24, in a direction orthogonal to the circumferential direction of the core 12.

The diameter D (see FIG. 2) of the holder body 32 is selected such that the relative positional relationship between the teeth portion 22 and the coil 24 is determined by the holder body 32 inserted between the teeth portion 22 and the coil 24. In other words, the diameter D of the holder body 32 determines the distance between the teeth portion 22 and the coil 24 in the direction orthogonal to the circumferential direction of the core 12.

On one end surface of the holder body 32, a jig engaging groove 34 that engages with a jig for rotating the holder body 32 is formed. The one end surface of the holder body 32 is an end surface that is opposite another end surface on a side inserted between the teeth portion 22 and the coil 24, among the two end surfaces of the holder body 32 in the central axis direction. Accordingly, the end surface on the side inserted between the teeth portion 22 and the coil 24 is the other end surface of the holder body 32.

On the circumferential surface of the holder body 32, a recessed portion 36 for housing the temperature detection element 30 is formed. The recessed portion 36 is formed along the central axis direction of the holder body 32, extending from the one end surface to the other end surface of the holder body 32. The temperature detection element 30 is housed in the recessed portion 36 such that a portion of the temperature detection element 30 protrudes from the circumferential surface of the holder body 32. There is a tendency for variation to occur in the size of the temperature detection element 30, but the recessed portion 36 is formed to be able to house the temperature detection element 30 in a state where a portion (temperature sensitive portion) of the temperature detection element 30 having such variation protrudes.

A wing portion 38 for fixing the holder body 32 to the coil 24 is formed on one end portion of the holder body 32. The one end portion of the holder body 32 is an end portion on the one end surface side of the holder body 32. The wing portion 38 may be provided integrally with the holder body 32, or may be provided to the holder body 32 as a separate component.

The wing portion 38 has a substantially constant thickness, and extends farther outward than the circumferential surface of the holder body 32 along a direction intersecting the central axis of the holder body 32. The wing portion 38 preferably extends along a direction orthogonal to the central axis of the holder body 32.

Furthermore, the wing portion 38 is formed with an arc shape oriented toward the recessed portion 36 from a side between a location on the side of the recessed portion 36 and a location on the side opposite the recessed portion 36, on the circumferential edge of the one end portion of the holder body 32, and has a substantially fan shape. The central position of the location where the arc shape is formed may be a position matching the central axis of the holder body 32, or may be a position differing from the central axis of the holder body 32.

Yet further, the wing portion 38 is formed such that, when seen from the one end surface side of the holder body 32 along the central axis direction of the holder body 32, the wing portion 38 avoids the protruding portion (one part of the temperature sensitive portion) of the temperature detection element 30 that protrudes from the recessed portion 36 beyond the circumferential surface of the holder body 32. The tip of the wing portion 38 faces this protruding portion, with a space therebetween.

A penetration hole 40 for applying an adhesive for bonding the coil 24 and the holder body 32 is formed in the wing portion 38. The shape of this penetration hole 40 is an arc in the example shown in FIG. 1 and FIG. 2, but may be another shape. Furthermore, the number of penetration holes 40 is one in the example of FIG. 1 and FIG. 2, but this number may be two or more.

[Temperature Detection Element Fixing Method]

Figure 3:
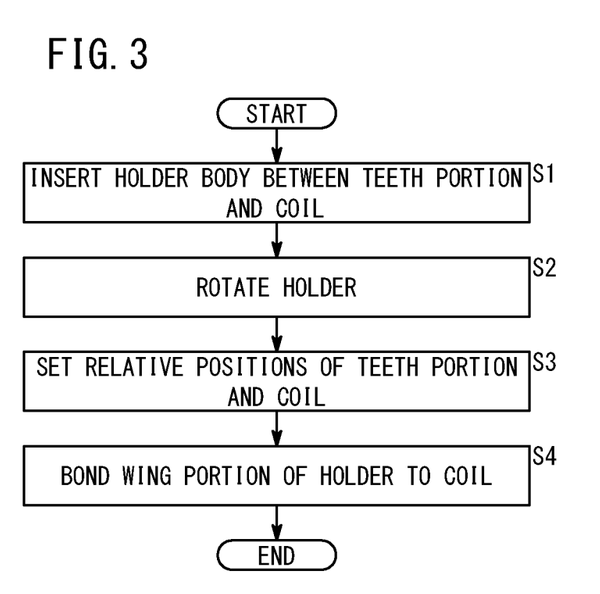
FIG. 3 is a flowchart showing the procedural steps of the temperature detection element fixing method.

The following describes the temperature detection element fixing method for fixing the temperature detection element 30 to the coil 24. FIG. 3 is a flowchart showing the procedural steps of the temperature detection element fixing method. The temperature detection element fixing method mainly includes an insertion step S1, a rotation step S2, a positioning step S3, and a bonding step S4.

The insertion step S1 is a step of inserting the holder body 32 between the teeth portion 22 and the coil 24 of the core 12. In this insertion step S1, first, the holder 14 having the temperature detection element 30 housed in the recessed portion 36 of the holder body 32 is prepared, and a jig is engaged with the jig engaging groove 34 of this holder 14.

Next, the core 12 in which the coil 24 is wound around the teeth portion 22 in a manner to be able to be displaced relative thereto is prepared, and the jig insertion operation is started. In this way, the holder body 32 is inserted between the teeth portion 22 and the coil 24 from the other end portion side.

As described above, the wing portion 38 extending farther outward than the circumferential surface of the holder body 32, along a direction intersecting the central axis of the holder body 32, is provided on the one end portion of the holder body 32. Accordingly, when the holder body 32 inserted between the teeth portion 22 and the coil 24 from the other end portion side is inserted up to a region near the one end portion, the wing portion 38 abuts on and is then locked at the edge portion of the coil 24. When the wing portion 38 is locked at the edge portion of the coil 24, the jig insertion operation is stopped.

The rotation step S2 is a step of rotating the holder 14 such that a portion of the temperature detection element 30 protruding from the recessed portion 36 of the holder body 32 contacts the coil 24. In the rotation step S2, the jig engaged with the jig engaging groove 34 of the holder 14 is rotated.

Due to the rotation of this jig, the holder body 32 rotates, and the protruding portion of the temperature detection element 30 protruding from the recessed portion 36 of the holder 14 beyond the circumferential surface of the holder body 32 moves toward an inward location of the coil 24. When the protruding portion of the temperature detection element 30 contacts this inward location of the coil 24, the jig rotating operation is stopped. The rotation step S2 may be performed simultaneously with the positioning step S3, or may be performed after the positioning step S3.

Figure 4A:
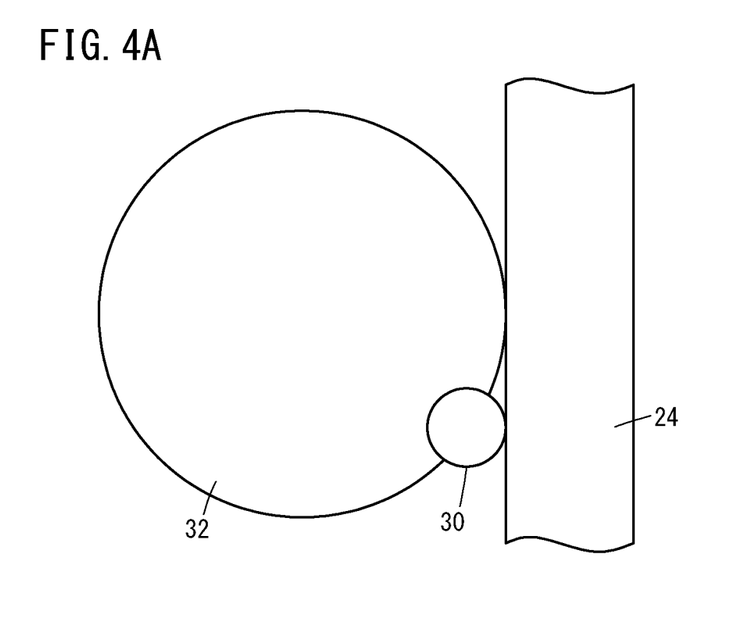
FIG. 4A is a schematic view of a state (1) of contact between a temperature detection element and a coil.
Figure 4B:
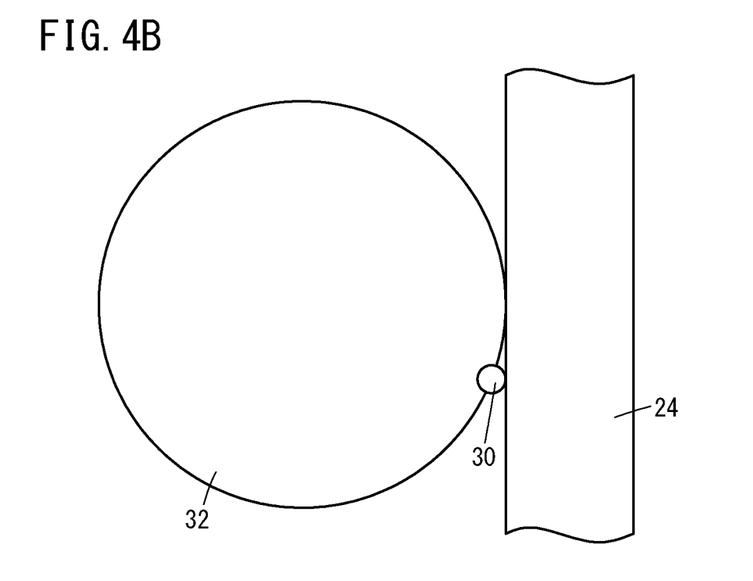
FIG. 4B is a schematic view of a state (2) of contact between the temperature detection element and the coil.

FIG. 4A is a schematic view of a state (1) of contact between the temperature detection element 30 and the coil 24, and FIG. 4B is a schematic view of a state (2) of contact between the temperature detection element 30 and the coil 24. The rotational angle of the holder body 32 differs between a case (FIG. 4A) in which the temperature detection element 30 housed in the recessed portion 36 has a large size within the tolerance (variation) range and a case (FIG. 4B) in which the temperature detection element 30 housed in the recessed portion 36 has a small size within the tolerance (variation) range. However, even when there is variation in the size of the temperature detection element 30, it is possible to cause this temperature detection element 30 to uniformly contact the coil 24 by adjusting the amount of rotation in the jig rotation operation.

The wing portion 38 of the holder 14 has a location formed as an arc shape extending toward the recessed portion 36 from one side between a location on the recessed portion 36 side and a location on an opposite side of the recessed portion 36, on the circumferential edge of the one end portion of the holder body 32. Therefore, even when the holder 14 inserted between the teeth portion 22 and the coil 24 has been rotated, the change of the contact surface between the coil 24 and the wing portion 38 tends to be small. Accordingly, when the temperature detection element 30 has contacted the coil 24, it is possible to restrict instances where the penetration hole 40 formed in the wing portion 38 of the holder 14 is not positioned at the edge portion of the coil 24.

Furthermore, the wing portion 38 of the holder 14 is formed such that, when seen from the one end surface side of the holder body 32 along the central axis direction of the holder body 32, the wing portion 38 avoids the protruding portion of the temperature detection element 30 that protrudes from the circumferential surface of the holder body 32. Therefore, even when the holder 14 is seen from the one end surface side of the holder body 32, the protruding portion of the temperature detection element 30 can be viewed without being blocked by the wing portion 38. Accordingly, it is possible to move the jig while visually checking the position of the temperature detection element 30 relative to the coil 24. Since the recessed portion 36 is formed from the one end surface of the holder body 32 as described above, it is possible to view not only the protruding portion of the temperature detection element 30 protruding from the recessed portion 36 beyond the circumferential surface of the holder body 32, but also part of the housed portion of the temperature detection element 30 housed in this recessed portion 36.

The positioning step S3 is a step of setting the relative positions of the teeth portion 22 and the coil 24, using the holder body 32 inserted between the teeth portion 22 and the coil 24. In the positioning step S3, the coil 24 is pressed from the outer circumferential side of the coil 24 where the holder body 32 is inserted, toward the teeth portion 22, with a prescribed pressure.

As described above, the diameter D of the holder body 32 determines the distance between the teeth portion 22 and the coil 24 in the direction orthogonal to the circumferential direction of the core 12. Accordingly, by having the coil 24 pressed from the outer circumferential side of the coil 24 toward the teeth portion 22, the relative positions of the teeth portion 22 and coil 24 are set by the holder body 32.

The operation of pressing the coil 24 may continue until the bonding step S4 ends. Furthermore, if the rotation step S2 and the positioning step S3 are performed simultaneously, the holder 14 is rotated while the coil 24 is being pressed from the outer circumferential side of the coil 24 toward the teeth portion 22.

The bonding step S4 is a step of bonding the holder 14 and the coil 24. In the bonding step S4, an adhesive is applied toward the penetration hole 40 formed in the wing portion 38 and the applied adhesive is dried, thereby bonding the holder 14 and the coil 24.

By forming the penetration hole 40, it is possible to bond a central portion of the wing portion 38 to the coil 24. If a case were assumed in which the penetration hole 40 was not formed, when attempting to bond the central portion of the wing portion 38 to the coil 24, the adhesive must be applied to the coil 24 before the rotation step S2, and smooth rotation of the holder body 32 is impeded by this adhesive. Accordingly, by forming the penetration hole 40, it is possible to bond the holder 14 and the coil 24 after the rotation step S2, and as a result, the holder body 32 can rotate smoothly.

[Operational Effect]

As described above, in the present embodiment, the recessed portion 36 is formed in the holder body 32 shaped as a circular pillar, and the temperature detection element 30 is housed in the recessed portion 36 such that a portion of the temperature detection element 30 protrudes from the recessed portion 36 beyond the inner circumferential surface of the holder body 32.

Therefore, by inserting the holder body 32 shaped as a circular pillar between the teeth portion 22 and the coil 24 of the core 12 and rotating the holder body 32, it is possible for the protruding portion of the temperature detection element 30 to uniformly contact the inner circumferential surface side of the coil 24 even when there is variation in the size of the temperature detection element 30. In other words, it is possible to absorb the tolerance of the temperature detection element 30 relative to the coil 24 using the rotation of the holder body 32 shaped as a circular pillar. Accordingly, with the present embodiment, it is possible to expand the tolerable range for size variation of the temperature detection element 30.

Methods for fixing the temperature detection element 30 to the coil 24 directly using an adhesive or resin can be considered, but with such methods it is difficult to judge whether the temperature detection element 30 is bonded to the coil 24 because the temperature detection element 30 is covered with the adhesive or resin.

In contrast, as described above, the present embodiment is useful in that it is possible for the protruding portion of the temperature detection element 30 to uniformly contact the inner circumferential surface of the coil 24, even when there is variation in the size of the temperature detection element 30.

Furthermore, since the coil 24 contacting the temperature detection element 30 is a part of the winding, the contact surface are tends to be small. Therefore, in the method for directly fixing the temperature detection element 30 to the coil 24 with the adhesive or resin, the bonding force between the temperature detection element 30 and the coil 24 is weak, and it is difficult to fix the temperature detection element 30 to the coil 24.

In contrast to this, the present embodiment includes the wing portion 38 that extends outward beyond the inner circumferential surface of the holder body 32 along a direction intersecting the central axis of the holder body 32 shaped as a circular pillar, and this wing portion 38 is bonded to the coil 24. Therefore, according to the present embodiment, the contact surface area is larger than in the method of directly fixing the temperature detection element 30 to the coil 24 with the adhesive or resin, and as a result it is easy to fix the temperature detection element 30 to the coil 24.

Other Embodiments

The above describes an embodiment as one example of the present invention, but the technical scope of the invention is not limited to the above described embodiment. It is apparent to persons skilled in the art that various alterations and improvements can be added to the above-described embodiments. It is also apparent from the scope of the claims that the embodiments added with such alterations or improvements can be included in the technical scope of the invention.

Figure 5:
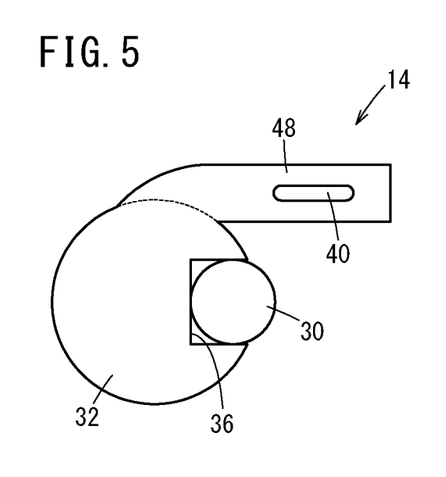
FIG. 5 is a schematic view of the holder of another embodiment (1) from the same viewpoint as FIG. 2.

For example, in the embodiment described above, the wing portion 38 has a location extending in a circular arc shape, but this location may extend in an arc shape including a curved surface that is something other than a portion of a circle. Furthermore, as shown in FIG. 5, a wing portion 48 that extends in a straight line may be adopted. If the wing portion 48 extends toward the recessed portion 36, it is easy for the wing portion 48 of the holder 14 to stay in contact with the coil 24 without moving away, even when the holder 14 in which the holder body 32 has been inserted between the teeth portion 22 and the coil 24 is rotated. Accordingly, in the same manner as in the embodiment described above, the wing portion 48 preferably extends toward the recessed portion 36.

Figure 6:
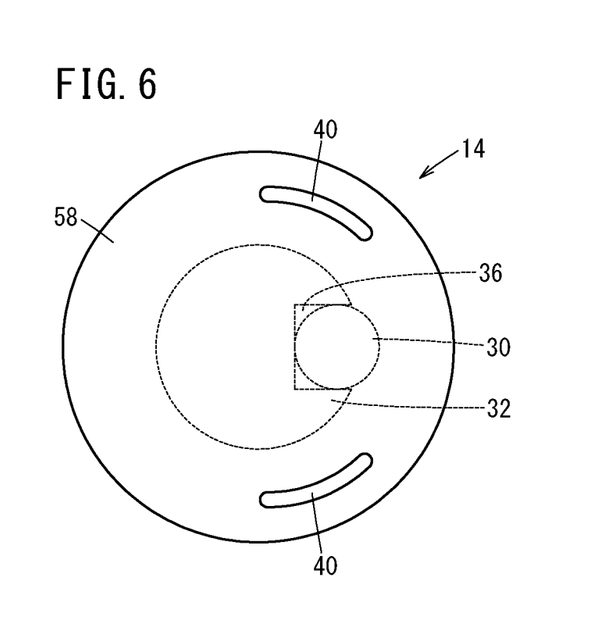
FIG. 6 is a schematic view of the holder of another embodiment (2) from the same viewpoint as FIG. 2.

Furthermore, in the embodiment described above, the wing portion 38 that is substantially fan-shaped is adopted, but a wing portion 58 that is shaped as a circular board may be adopted, as shown in FIG. 6. If such a wing portion 58 is used, it is possible for the wing portion 58 to always be in contact with the coil 24, even when the holder 14 in which the holder body 32 has been inserted between the teeth portion 22 and the coil 24 is rotated. The central position of the wing portion 58 shaped as a circular board coincides with the central axis of the holder body 32 in FIG. 6, but this central position may be a position differing from the central axis of the holder body 32.

Figure 7:
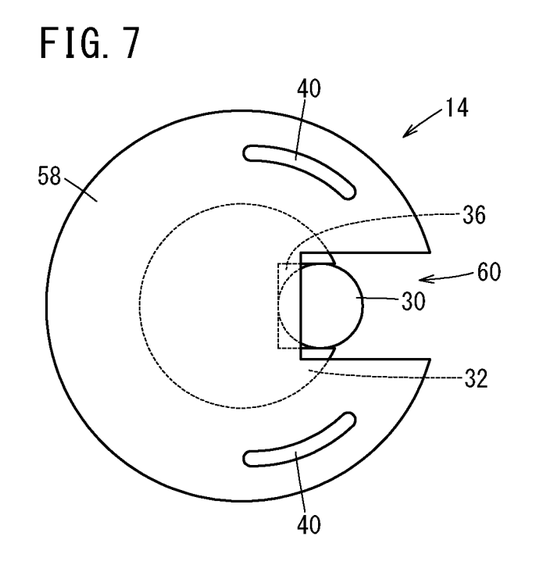
FIG. 7 is a schematic view of the holder of another embodiment (3) from the same viewpoint as FIG. 2.
Figure 8:
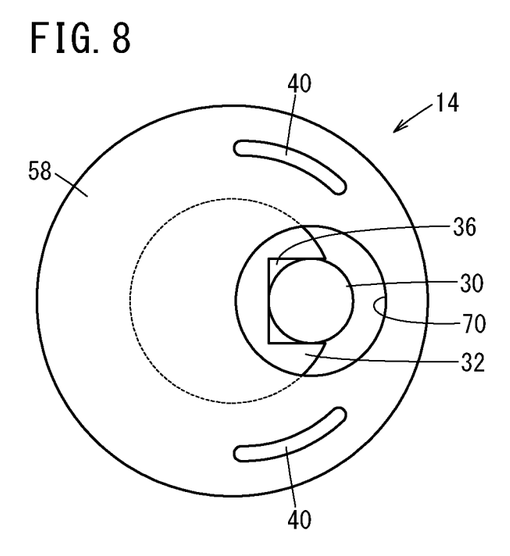
FIG. 8 is a schematic view of the holder of another embodiment (4) from the same viewpoint as FIG. 2.

If the wing portion 58 has a circular board shape, the temperature detection element 30 is blocked and cannot be seen when viewed from the one end surface side of the holder body 32 along the central axis direction of the holder body 32. Accordingly, a notch 60 may be formed in the wing portion shaped as a circular board, such as shown in the example of FIG. 7, or a penetration hole 70 may be formed in the wing portion 58, as shown in the example of FIG. 8. The notch 60 and the penetration hole 70 are formed at a position making it possible for at least the protruding portion of the temperature detection element 30 to be seen when viewed from the one end surface side of the holder body 32 along the central axis direction of the holder body 32. If the recessed portion 36 is formed from the one end surface of the holder body 32, as in the embodiment described above, the notch 60 and the penetration hole 70 may be formed at a position that enables the recessed portion 36 and the protruding portion of the temperature detection element 30 to be visually confirmed. The outer shape of the wing portion 58 is circular in the examples of FIG. 6 and FIG. 8, but is also included in a circular shape in the case where the notch 60 shown in FIG. 7 is formed.

Furthermore, in the embodiment described above, the wing portion 38 extends from the one end portion of the holder body 32, but may instead extend from a position closer to the center than this one end portion. When the wing portion extends from this position closer to the center than the one end portion of the holder body 32, a portion of the holder body 32 from this position to the one end portion protrudes from an open portion of the coil 24. Accordingly, in consideration of reducing the size, the wing portion 38 preferably extends from the one end portion of the holder body 32.

In the embodiment described above, the jig engaging groove 34 is formed in the holder body 32, but this jig engaging groove 34 may be omitted. If the jig engaging groove 34 is omitted, the holder body 32 is inserted between the teeth portion 22 and the coil 24 and rotated using a jig that grips the holder 14.

In the embodiment described above, the recessed portion 36 is formed along the central axis direction of the holder body 32, from the one end surface to the other end surface of the holder body 32. However, the recessed portion 36 may be formed along the central axis direction of the holder body 32 from the one end surface of the holder body 32 to a position on the way to the other end surface. Furthermore, the recessed portion 36 may be formed along the central axis direction of the holder body 32 on a circumferential surface of the holder body 32 other than the one end surface or the other end surface of the holder body 32. In other words, the recessed portion 36 only needs to be formed along the central axis direction of the holder body 32 on a circumferential surface of the holder body 32. However, it should be noted that the recessed portion 36 is preferably formed along the central axis direction of the holder body 32 from the one end surface of the holder body 32.

(Technical Concepts Derived from the Embodiments)

The technical concepts that can be understood from the embodiments described above will be described below.

[First Technical Concept]

The holder (14) for fixing the temperature detection element (30) to the coil (24), includes: the holder body (32) shaped as a circular pillar; the recessed portion (36) formed on a circumferential surface of the holder body (32), along the central axis of the holder body (32); the wing portion (38, 48, 58) that extends farther outward than the circumferential surface of the holder body (32), along a direction intersecting the central axis of the holder body (32); and the temperature detection element (30) that is housed in the recessed portion (36) such that a portion of the temperature detection element protrudes from the circumferential surface of the holder body (32).

With this holder (14) it is possible to absorb the tolerance (variation) in the size of the temperature detection element (30) relative to the coil (24), by inserting the holder body (32) shaped as a circular pillar between the teeth portion (22) of the core (12) and the coil (24) and rotating the holder body (32), for example. Accordingly, it is possible to increase the tolerable range for the variation in size of the temperature detection element (30).

In the holder (14) described above, the wing portion (38, 48, 58) may extend toward the recessed portion (36). In this way, even when the holder (14) is rotated, the wing portion (38, 48, 58) of the holder (14) easily continues to contact the coil (24) without moving away.

In the holder (14) described above, the wing portion (38, 48, 58) may include a location that is formed with an arc shape. In this way, even when the holder (14) is rotated, there is only a small change in the contact surface between the wing portion (38, 48, 58) and the coil (24).

In the holder (14) described above, the wing portion (38, 48, 58) may extend from an end portion of the holder body (32) in a central axis direction of the holder body (32). In this way, the overall apparatus can be made smaller.

In the holder (14) described above, the wing portion (58) may have a circular outer shape. In this way, even when the holder (14) is rotated, the wing portion (58) of the holder (14) easily continues to contact the coil (24) without moving away.

In the holder (14) described above, the wing portion (38, 48, 58) may be formed in a manner to avoid a portion of the temperature detection element (30) protruding from the circumferential surface of the holder body (32), when the wing portion (38, 48, 58) is viewed along a central axis direction of the holder body (32). In this way, when looking at the wing portion (38, 48, 58) along the central axis direction of the holder body (32), it is possible to visually confirm the protruding portion of the temperature detection element (30) without the view being blocked by the wing portion (38, 48, 58).

In the holder (14) described above, the wing portion (38, 48, 58) may include a penetration hole (40) through which an adhesive for bonding the coil (24) and the holder body (32) is applied. In this way, it is possible to bond the coil (24) and the holder body (32) through the wing portion (38, 48, 58) after the holder (14) has been rotated, and as a result, the holder body (32) can be rotated smoothly.

In the holder (14) described above, the recessed portion (36) may be formed along a central axis direction of the holder body (32), from one end surface of the holder body (32). In this way, the entire end portion of the temperature detection element (30) housed in the recessed portion (36) can be seen or visually confirmed when the wing portion (38, 48, 58) is viewed along the central axis direction of the holder body (32).

[Second Technical Concept]

The electric motor (10) includes: the holder (14) described above; the core (12) including the teeth portion (22); and the coil (24) that is wound around the teeth portion (22), wherein the holder body (32) is inserted between the teeth portion (22) and the coil (24), and the wing portion (38, 48, 58) is fixed to the coil (24).

With this electric motor (10), it is possible to absorb the tolerance (variation) in the size of the temperature detection element (30) relative to the coil (24), by rotating the holder body (32) shaped as a circular pillar and inserted between the teeth portion (22) and the coil (24) of the core (12). Accordingly, it is possible to increase the tolerable range of the variation for the size of the temperature detection element (30).

[Third Technical Concept]

The temperature detection element (30) fixing method using the holder (14) described above, includes: an insertion step (S1) of inserting the holder body (32) between the coil (24) and the teeth portion (22) of the core (12) around which the coil (24) is wound; a rotation step (S2) of rotating the holder (14) such that a portion of the temperature detection element (30) protruding from the recessed portion (36) contacts the coil (24); and a bonding step (S4) of bonding the wing portion (38) and the coil (24).

With the temperature detection element (30) fixing method, it is possible to absorb the tolerance (variation) in the size of the temperature detection element (30) relative to the coil (24). Accordingly, it is possible to increase the tolerable range of the variation for the size of the temperature detection element (30).

The temperature detection element (30) fixing method described above may further include a positioning step (S3) of setting relative positions of the teeth portion (22) and the coil (24) using the holder body (32) inserted between the coil (24) and the teeth portion (22). With this configuration, the holder (14) for fixing the temperature detection element (30) can also be used for positioning the teeth portion (22) and the coil (24), and accordingly the rise in the number of components of the holder (14) can be curbed.

What is claimed is:

1. A holder configured to fix a temperature detection element to a coil, the holder comprising:
   a holder body shaped as a circular pillar;
   a recessed portion formed on a circumferential surface of the holder body, along a central axis of the holder body;
   a wing portion that extends farther outward than the circumferential surface of the holder body, along a direction intersecting the central axis of the holder body; and
   the temperature detection element that is housed in the recessed portion so that a portion of the temperature detection element protrudes from the circumferential surface of the holder body.

2. The holder according to claim 1, wherein the wing portion extends toward the recessed portion.

3. The holder according to claim 1, wherein the wing portion includes a location that is formed with an arc shape.

4. The holder according to claim 1, wherein the wing portion extends from an end portion of the holder body in a central axis direction of the holder body.

5. The holder according to claim 1, wherein the wing portion has a circular outer shape.

6. The holder according to claim 1, wherein the wing portion is formed in a manner to avoid a portion of the temperature detection element protruding from the circumferential surface of the holder body, when the wing portion is viewed along a central axis direction of the holder body.

7. The holder according to claim 1, wherein the wing portion includes a penetration hole through which an adhesive for bonding the coil and the holder body is applied.

8. The holder according to claim 1, wherein the recessed portion is formed along a central axis direction of the holder body, from one end surface of the holder body.

9. An electric motor comprising:
   the holder according to claim 1;
   a core including a teeth portion; and
   a coil that is wound around the teeth portion,
   wherein
   the holder body is inserted between the teeth portion and the coil, and
   the wing portion is fixed to the coil.

10. A temperature detection element fixing method using the holder according to claim 1, the method comprising:
    an insertion step of inserting the holder body between the coil and a teeth portion of a core around which the coil is wound;
    a rotation step of rotating the holder so that a portion of the temperature detection element protruding from the recessed portion contacts the coil; and
    a bonding step of bonding the wing portion and the coil.

11. The temperature detection element fixing method according to claim 10, further comprising:

a positioning step of setting relative positions of the teeth portion and the coil using the holder body inserted between the coil and the teeth portion.

\* \* \* \* \*